United States Patent

Mollick

[15] 3,686,944
[45] Aug. 29, 1972

[54] TRUE AIR SPEED INDICATOR
[72] Inventor: Milton Mollick, Allentown, Pa.
[73] Assignee: Ametek, Inc., New York, N.Y.
[22] Filed: May 6, 1970
[21] Appl. No.: 35,210

[52] U.S. Cl. .................................... 73/182, 73/393
[51] Int. Cl. .......................................... G01c 21/10
[58] Field of Search...... 73/182, 393, 368.7, 181, 183

[56] References Cited

UNITED STATES PATENTS

| | | | |
|---|---|---|---|
| 2,927,460 | 3/1960 | Darbujan | 73/182 |
| 3,340,731 | 9/1967 | Hunter | 73/182 |
| 2,412,541 | 12/1946 | Shivers | 73/393 X |
| 3,332,230 | 7/1967 | Pawl | 116/129 |
| 1,633,380 | 6/1927 | Irwin | 73/393 X |
| 2,662,757 | 12/1953 | Mock | 73/368.7 X |
| 3,126,737 | 3/1964 | Gibbs | 73/181 |
| 3,413,952 | 12/1968 | Horns | 116/131 X |

Primary Examiner—Donald O. Woodiel
Attorney—Smythe & Moore

[57] ABSTRACT

An air speed indicator has a pointer movable over a fixed scale to display the indicated air speed of the aircraft. A rotatable dial having a true air speed scale thereon is co-axial with the fixed dial and visible therethrough. The rotatable dial is connected through gearing and linkage to an ambient density sensor which is responsive to ambient temperature and altitude pressure. The sensor means comprises a single system including a gas filled bulb responsive to ambient temperature connected to a diaphram in the instrument case, the case being subjected to altitude pressure.

6 Claims, 7 Drawing Figures

Patented Aug. 29, 1972

INVENTOR
MILTON MOLLICK

BY
*Sughrue & Moore*
ATTORNEYS

Patented Aug. 29, 1972
3,686,944
3 Sheets-Sheet 2
FIG.3
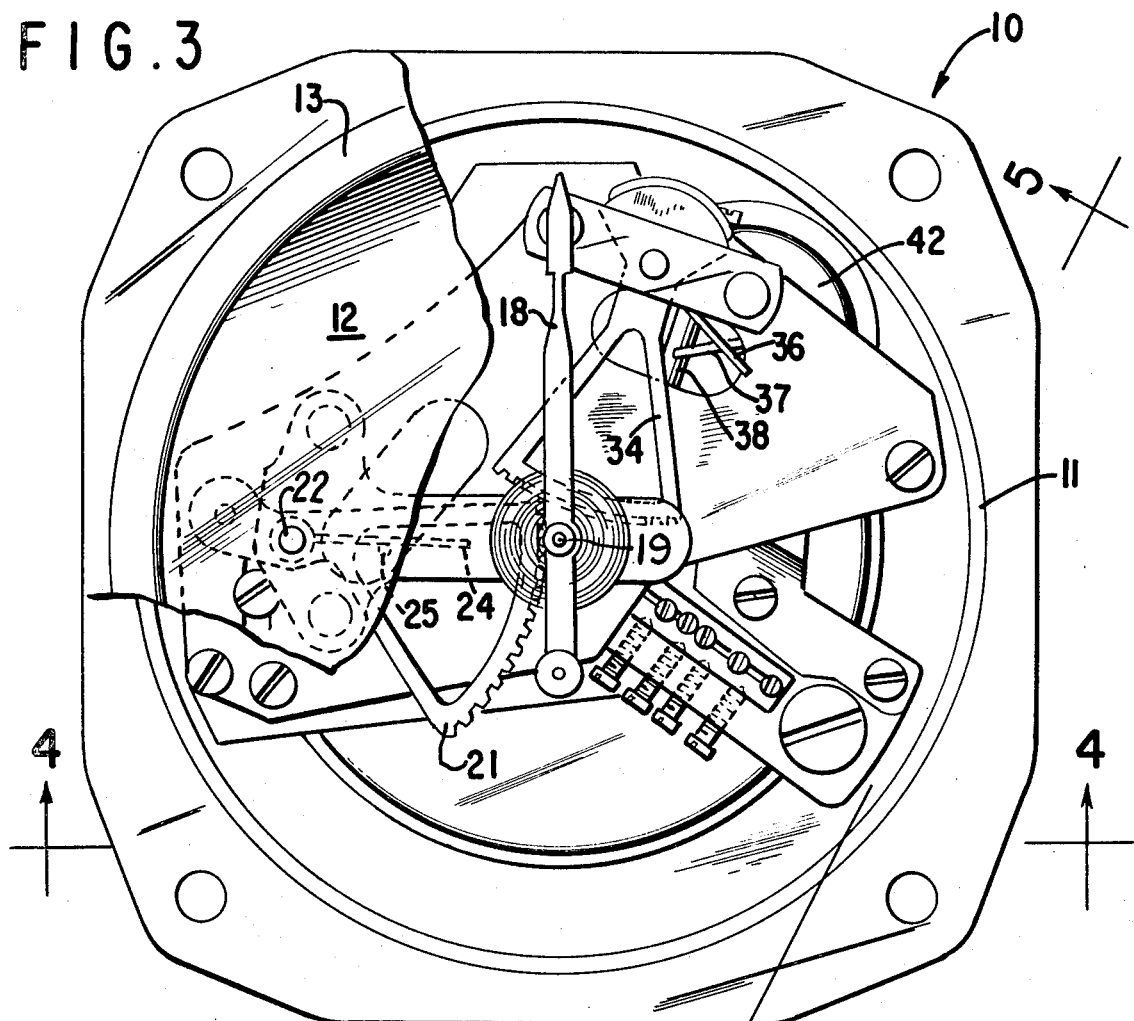
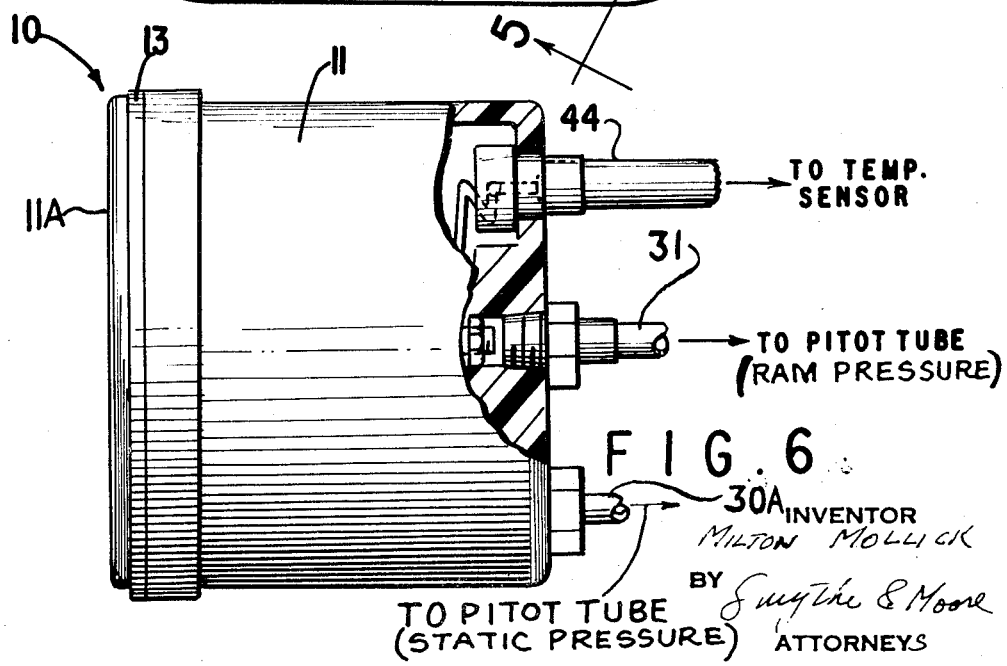
FIG.6
INVENTOR
MILTON MOLLICK
BY Smythe & Moore
ATTORNEYS Patented Aug. 29, 1972

INVENTOR
MILTON MOLLICK
BY
*[signature]*
ATTORNEYS

TRUE AIR SPEED INDICATOR

The present invention relates to an air speed indicator for aircraft wherein both the indicated air speed and true air speed will be simultaneously indicated. Indicated air speed in present instruments is a function of the pressure difference between the total and static pressure as obtained from the pitot tube. In order to obtain the true air speed of the aircraft or vehicle relative to the atmosphere in which it is located, a density correction must be made, the correction depending upon the ambient temperature and the altitude pressure.

Air speed indicators are known which indicate simultaneously the true and indicated air speed. However, such instruments are unduly complicated in that they employ a separate pointer for each air speed, or use a number of sensors to measure temperature and pressure.

One of the objects of the present invention is to provide an improved and simple air speed indicator for indicating simultaneously the true and indicated air speed of an aircraft.

In one aspect of the present invention, an air speed indicator for aircraft may comprise a fixed dial having an indicated air speed scale thereon. A rotatable dial is positioned concentrically with the fixed dial and has a true air speed scale thereon. The fixed dial may be transparent so that the rotatable dial is visible therethrough. A pointer is mounted for rotary movement about an axis co-axial with the dial for indicating simultaneously an aligned set of scaled markings on both dials. Operatively connected to the pointer is a means responsive to the differential air pressure from the pitot tube for moving the pointer over the dials to show the indicated air speed. Operatively connected to the rotatable dial is single density sensor means responsive to both the ambient temperature and/or and pressure altitude for moving the dial so that the true air speed will be indicated by the pointer when the pointer is positioned in response to an indicated air speed.

The single sensor means preferably comprises a gas filled bulb which is exposed to the atmosphere surrounding the aircraft. The air speed indicator is enclosed in a sealed casing to retain ambient static atmospheric pressure therein.

Other objects, advantages and features of the present invention will become apparent from the following description and drawings, which are merely exemplary.

In the drawings:

FIG. 3 is a front view of the instrument according to the present invention with the dial faces cut away;

FIG. 6 is a reduced size elevational or side view of the instrument casing assembly with a portion of the casing being cut away.

Proceeding next to the drawings wherein like reference symbols, where appropriate, indicate the same parts throughout the various views, a specific embodiment of the present invention will be described in detail.

With particular reference to FIGS. 3–6, an air speed indicator according to the present invention is indicated generally at 10 in FIG. 6 which comprises a sealed casing 11, which may be of plastic, with an open end 11A covered by a transparent window of glass or plastic 12 (FIG. 3) held in position by ring 13.

Figure 1:
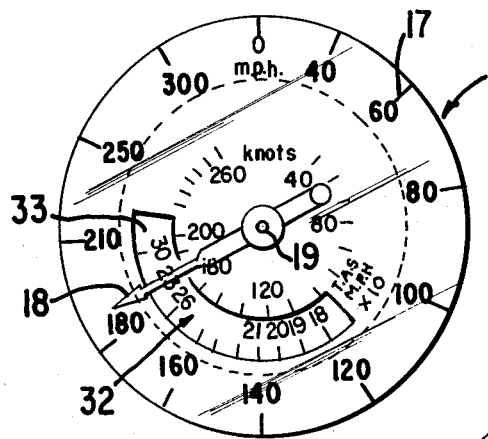
FIG. 1 is a view of the dial faces of the indicator according to the present invention showing the graduated scales thereon.
Figure 2:
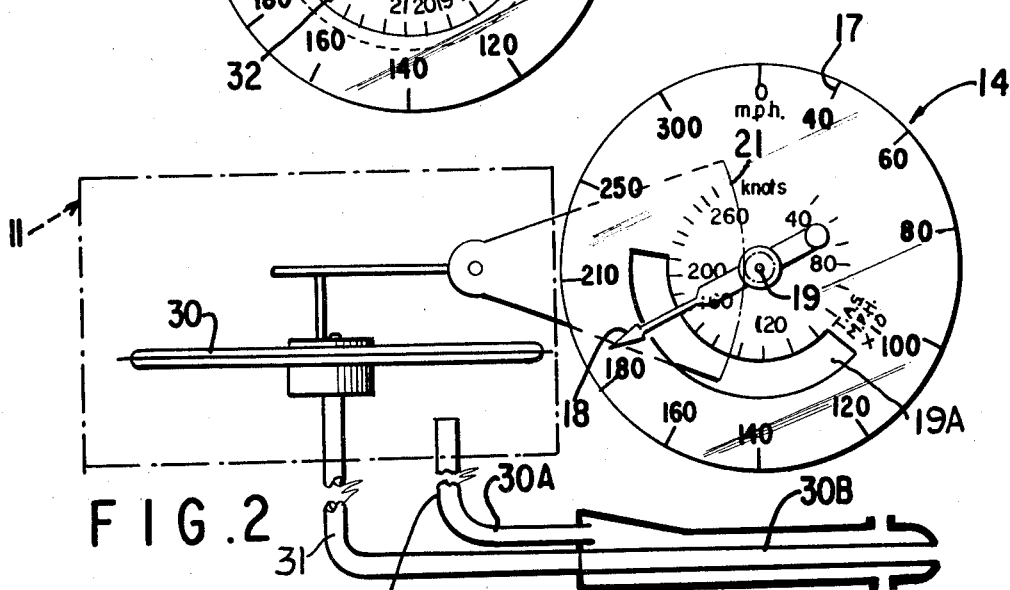
FIG. 2 is a schematic representation showing the operative connection between the pointer and the pitot tube for indicating indicated air speed.

Dial 14 is secured by screws 15 (FIG. 4) to mounting posts 16. Around the outer periphery of dial 14 is the indicated air speed scale 17 (FIG. 1). Pointer 18 is movable relative to dial 14 and is mounted on rotatable shaft 19 which is concentric with dial 14. Near the lower end of shaft 19 (FIG. 4) is a pinion gear 20 meshing with sector gear 21 pivotally mounted at 22. Tubular or arbor shaft element 23 is concentric with sector gear axis 22 and is secured to gear 21. Extending radially outwardly from arbor shaft element 23 is pin 24 which is engaged by another pin 25 extending upwardly from rocker arm 26 journalled between pointed pivot means 27. Rocker arm 26 has a second pin 28 extending therefrom engagable by pin 29 secured to movable part of diaphragm 30. As schematically shown in FIG. 2, the altitude static pressure is conducted by tube 30A to the interior of the sealed instrument casing. The interior of diaphragm 30 is connected to the pitot tube total pressure connection 30B through connection 31. The diaphragm 30 is therefore responsive to the difference between total and static pressure. Movement of diaphragm 30 will move pointer 18 to show the aircraft indicated air speed.

The true air speed is indicated on rotatable dial 32 (FIG. 4) which is co-axial with dial 14 and pointer 18 and has pinion gear 33A secured to its underside. Dial 32 has a graduated scale 33 thereon to indicate true air speed. Dial 32 is positioned immediately below dial 14 and is visible therethrough. Instead of making dial 14 transparent, the stationary dial may be provided with a slotted portion 19A through which the scale markings on rotatable dial 32 are visible. Also, the dials can be made so that the true air speed dial indications are at the rim of the indicated air speed dial and the indicated air speed is on a central dial.

Dial 32 is rotated by means of a sector gear 34 (FIGS. 3, 5) pivoted at 35 and having pin 36 extending radially therefrom. Pin 36 is engaged by pin 37 extending from rocker arm 38 journalled on pointed bearings 39. Extending outwardly from rod 38 is a pin 40 engagable by a second pin 41 extending from the movable side of diaphragm 42 which is responsive to pressure altitude and temperature.

Figure 2A:
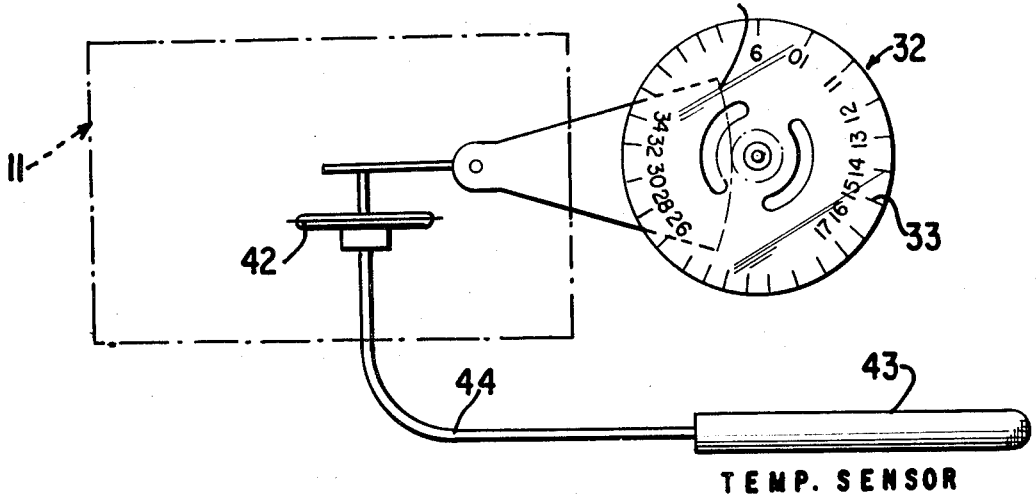
FIG. 2A is a schematic representation showing the connection between the temperature and altitude pressure sensor and a rotatable dial for indicating true air speed.
Figure 4:
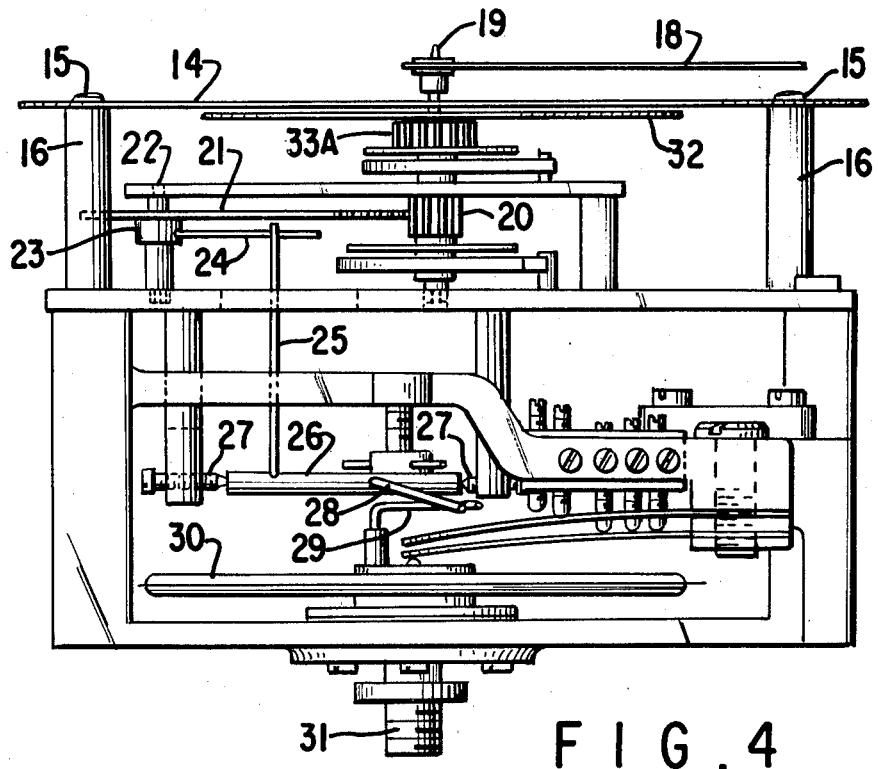
FIG. 4 is an elevational or side view looking in the direction of the arrows 4—4 of FIG. 3.
Figure 5:
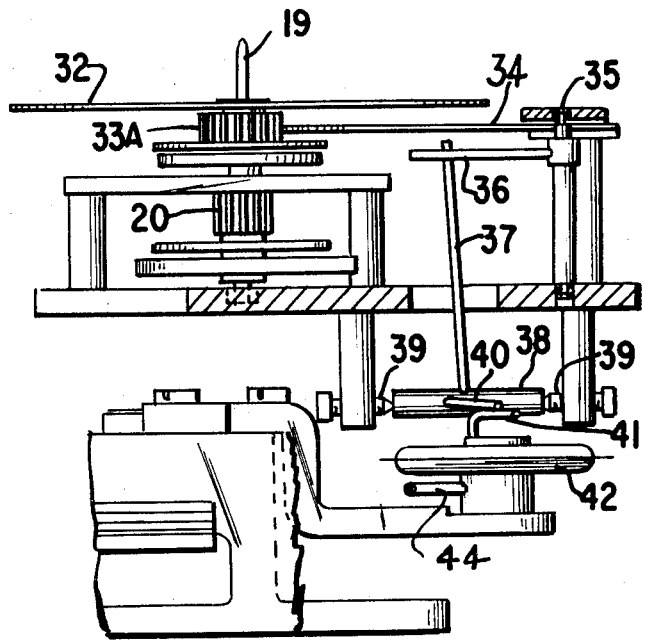
FIG. 5 is an enlarged elevational or side view looking in the direction of the arrows 5—5 of FIG. 3.

To sense the temperature of the ambient atmosphere, a gas filled bulb 43 (FIG. 2A) is connected in series with diaphragm 42 through flexible tube 44. Bulb 43 and diaphragm 42 are filled with an inert gas which is maintained at a predetermined pressure and temperature at time of filling. The volume of bulb 43 is relatively large with respect to the volume of diaphragm 42 so that only variations of the bulb temperature will cause temperature corrections. The diaphragm will respond to ambient static pressure variations because it is enclosed in the sealed instrument casing which is subject to static altitude pressure.

Since the bulb 43 and flexible tube 44 are rigid as compared to the diaphragm, the bulb and tube will not respond to static pressure variations. With this construction, the movement of the rotatable dial 32 will represent a correction factor as imposed by ambient temperature and altitude pressure which is a function of the density of the air through which the airplane is flying.

It will be understood that various details of construction and arrangement of parts may be made without departing from the spirit of the invention except as defined in the appended claims.

What is claimed is:

1. In an air speed indicator for aircraft, a fixed dial having an indicated air speed scale thereon, a rotatable dial concentric with said fixed dial and having a true air speed scale thereon visible in conjunction with said indicated air speed scale, a pointer mounted for rotary movement about an axis co-axial with said dials for indicating simultaneously an aligned set of scale markings on both dials, means responsive to differential air pressure and operatively connected to said pointer for moving said pointer over the dials to indicate the indicated air speed, and single density sensor means responsive to the ambient atmospheric temperature and the ambient static altitude pressure comprising a diaphragm connected in series with a gas filled bulb exposed to the surrounding atmosphere, said single sensor means being operatively connected to said rotatable dial for moving said dial, said bulb being predeterminedly filled to combine pressure and temperature response to provide the density correction so that the true air speed will be indicated by the pointer when the pointer is positioned in response to the indicated air speed.

2. In an air speed indicator as claimed in claim 1 wherein at said fixed dial is transparent, said rotary dial being mounted below said fixed dial.

3. In an air speed indicator as claimed in claim 1 wherein said gas comprises an inert gas at a pressure equal to or less than atmospheric pressure.

4. In an air speed indicator as claimed in claim 1 wherein the pressure of the inert gas in the diaphragm and bulb combination may be preadjusted to provide an optimum density correction, the volume of the bulb being relatively large with respect to the volume of the diaphragm.

5. In an air speed indicator as claimed in claim 1 and comprising a pinion gear co-axially mounted on said rotary dial, a sector gear meshing with said pinion gear, and linkage means between said diaphragm and sector gear for transmitting the movement of the diaphragm to said rotatable dial through said sector and pinion gears.

6. In an air speed indicator as claimed in claim 1 and comprising a sealed casing enclosing the air speed indicator and to retain static atmospheric pressure.

* * * * *

UNITED STATES PATENT OFFICE
CERTIFICATE OF CORRECTION

Patent No. 3,686,944          Dated August 29, 1972

Inventor(s) Milton Mollick

It is certified that error appears in the above-identified patent and that said Letters Patent are hereby corrected as shown below:

Column 1, line 36, "and/or" should be deleted.
Column 4, line 8, after "at" insert --least a portion of--.

Signed and sealed this 30th day of January 1973.

(SEAL)
Attest:

EDWARD M. FLETCHER, JR.
Attesting Officer

ROBERT GOTTSCHALK
Commissioner of Patents